Jan. 31, 1956    P. BUISSON    2,732,625
ELECTRONIC COMPARATOR
Filed Aug. 24, 1954    2 Sheets-Sheet 1
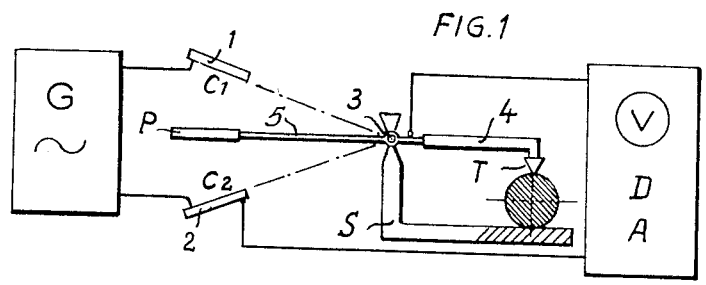
FIG. 1
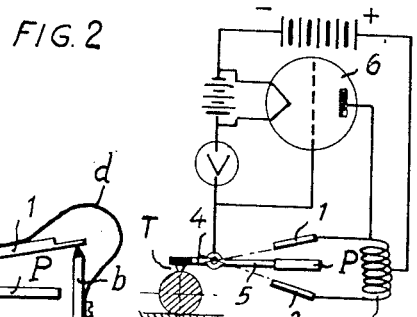
FIG. 2
FIG. 4
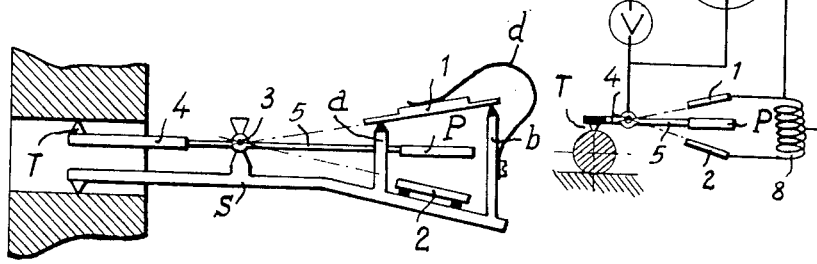
FIG. 5    FIG. 3
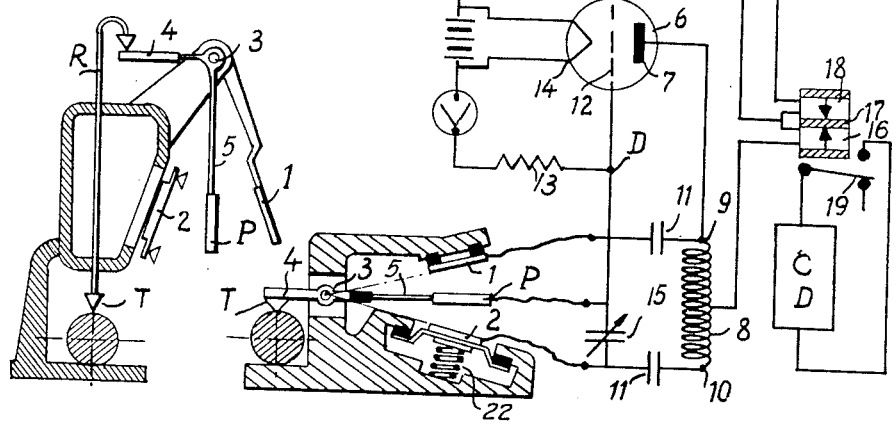
Inventor
P. Buisson

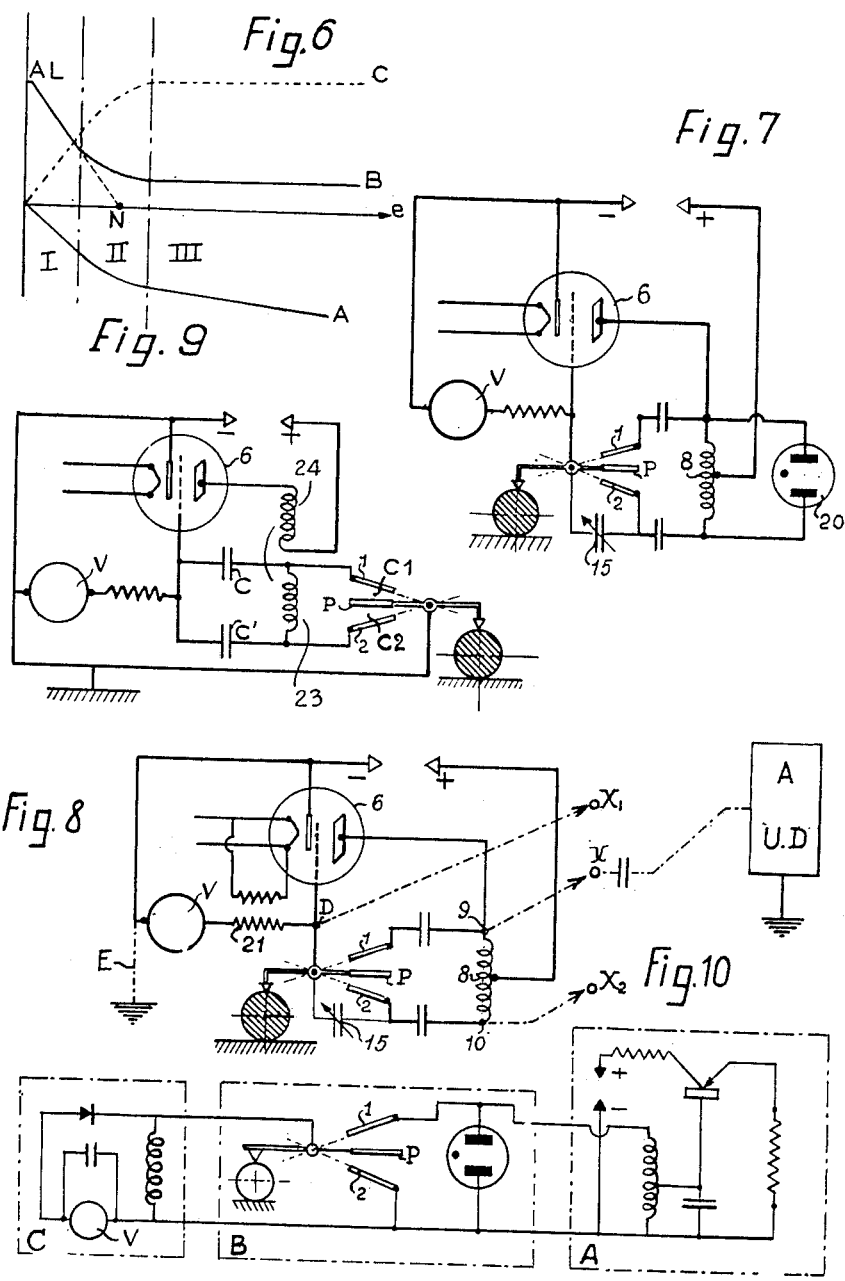

United States Patent Office 2,732,625
Patented Jan. 31, 1956

2,732,625

ELECTRONIC COMPARATOR

Pierre Buisson, Vanves, France

Application August 24, 1954, Serial No. 451,729

Claims priority, application France August 27, 1953

11 Claims. (Cl. 33—148)

The present invention has for its object an electronic comparator for the measurement of small displacements or differences. As a subsidiary function, the instrument may also cause, for example, the stoppage of an operation when the difference in dimensions of a member in course of machining, with respect to a reference value, becomes less than a certain value; the sorting of parts by dimension may also be carried out by this means.

Methods and apparatus are already known in which the variations of a dimension can be converted to variations in inductance or in capacity, the latter variations then being measured in order to find the value of the variations in dimensions.

The known types of apparatus utilising inductances present difficulties in manufacture, in particular when it is desired to obtain linear response-curves.

In certain known types of apparatus which utilise condensers, arrangements are employed in which the displacement of the feeler produces variation of a capacity, so that the measurement of the capacity can be made by measuring the frequency of an oscillatory circuit tuned by this capacity. In these circumstances, it is difficult to construct an apparatus which is stable and which will give results independent of the ambient temperature, of the ionisation of the atmosphere, etc.

In the French patent application filed on October 7, 1944, in the name of the present applicant, for "a method of precise measurement by means of variation of an electrical capacity," it has been sought to eliminate this error by simultaneously varying in opposite senses an even number of condensers connected in the arms of a Sauty bridge. These variations give rise to unbalance in the bridge, and this can be compensated by a displacement which acts on an auxiliary condenser so as to restore the balance.

In patent specification No. 1,009,689 of June 17, 1948, in the name of the present applicant, a different double-capacity element was used to determine a position, by operating an electrical compensation for the position determined.

These systems in which the measurement is always effected at the zero point bridge, are perfectly stable since they are independent of external influences (ambient temperature, moisture content of the air, ionisation, voltage and frequency of supply), but they have certain inherent disadvantages.

In the first place, they require a relatively large electrical amplification (certain apparatus of this type have up to six tubes), and this excludes the possibility of housing the amplifier and the voltage generator in close proximity to the feeler member. There must therefore be a feeder-line between the two, and this makes it necessary to use a relatively high capacity in order that the parasitic variations of capacity in the feeder-line (due to its twist or deformation, etc.) shall be negligible with respect to the measured variations in capacity.

This solution in its turn necessitates large and bulky condensers and it becomes necessary to increase the number or the surface area of the working electrodes and, in the case in which the moving electrode is displaced in a direction at right angles to the plane of the blades, the separation of the fixed plates should be large enough to offer a sufficient space for the disengagement of the feeler or feelers. These two methods only result in the construction of fairly bulky condensers.

The present invention removes these drawbacks by enabling, in particular, a considerable reduction to be effected in the bulk of the condensers, and also a reduction in the amount of amplification necessary, both of which features result in a reduction in the cost of the apparatus.

The apparatus in accordance with the invention, which is constituted by a double variable condenser, the two capacities of which vary in reverse senses as a function of the displacement to be measured, and together forming a capacity potential divider supplied by a high frequency current, is especially noteworthy in that its output potential is measured in the circuit of a voltmeter. It will be appreciated that with such an arrangement, the absolute value of the capacities is matter of indifference, provided that it is large enough for the impedance $$\frac{1}{\omega C}$$

to be small with respect to the resistance of the voltmeter circuit which is used to measure the variations of the ratio of the capacities.

In accordance with a further special feature of the present invention, the double condensers used have plates inclined at an angle to each other, which makes it possible to obtain, in a convenient manner, indications which vary practically in a linear fashion.

In one preferred form of embodiment of the invention, the double condenser is formed by two fixed plates at an angle to each other, and between which is adapted to move a moving plate pivoted about an axis located at the intersection of the planes in which the said fixed plates are contained. This enables the construction, for example, of measuring arrangements which have practically no friction.

In accordance with a preferred constructional arrangement, one of the fixed plates rests on abutments and it may move with the moving plate so as to provide a sufficient clearance to accommodate over-thicknesses. This enables the dielectric distance to be reduced whilst increasing at the same time the capacity and the sensitivity, the volume of the condenser being also reduced.

The invention additionally provides for the completion of the arrangement by a trimmer condenser enabling the zero of the instrument to be adjusted.

Finally, the invention is directed to a combination of these elements in a new industrial product in which the capacitative potential divider is utilised in combination with a special circuit comprising an oscillator-detector and amplifier combined in a single tube acting as a potential generator, and permitting the indication of the displacements in one direction only of the movable condenser plate, whilst at the same time rendering the indications independent of variations in the voltage supply.

The scope and the object of the present invention will best be understood as also will the various advantages which it presents, by reference to the different forms of embodiment described below, by way of example only and not in any limiting sense, and with reference to the drawings which show:

In Fig. 1, the basic diagram of the measurement of a displacement by means of a capacitative potentiometer.

In Fig. 2, a simplified diagram showing the combination of the variable double condenser with a single detector-oscillator tube which forms a characteristic feature of the invention.

In Fig. 3, an amplified diagram similar to that of Fig. 2 showing one method of actuating a utilisation device and a mechanical combination of the double condenser with the comparator feeler.

In Fig. 4, a form of embodiment of the double condenser specially adapted for taking internal measurements.

In Fig. 5, a form of embodiment of the feeler and the double variable condenser, adapted for making external measurements.

In Fig. 6, the curves of plate-current (B) and grid-potential A in the arrangement shown in Fig. 9, arranged as ordinates, as a function of the displacements of the feeler of the comparator plotted as abcissae. The values given correspond to R. M. S. values. The curve C shows, in addition, the corresponding high-frequency plate voltage.

In Fig. 7, a diagram similar to that shown in Fig. 2, and including a gas-filled tube for stabilising the voltage of supply.

In Fig. 8, a circuit diagram similar to that shown in Fig. 2 and including a compensating resistance.

In Fig. 9, a circuit diagram generally similar to that shown in Fig. 2, and adapted to the case in which the feeler of the comparator cannot be electrically insulated from earth.

With reference to Fig. 1, the two fixed plates 1, 2, of a double condenser $C_1$, $C_2$ are supplied with a high-frequency voltage produced by a generator G. A moving vane P is rigidly coupled to the feeler T of the comparator and its displacement causes, at the same time, an increase in the capacity $C_1$ and a reduction in the capacity $C_2$, or conversely. There can be derived between P and 1 a certain alternating potential which may be rectified in a detector D and then amplified if necessary in a direct-current amplifier A, connected to a measuring instrument V. It will be understood that, when the vane P starts from a position in which it is very close to the fixed plate 1 and approaches the fixed plate 2, the voltage $V_{AB}$, at the terminals of the detector, starts from a very low value and increases in a continuous manner up to a maximum value which is reached when it is very close to the fixed plate 2. It can be shown that this device functions practically in the same way as a capacitative potential divider, and that the voltage $V_{AB}$ obtained is solely a function of the ratio of the two capacities $C_1$ and $C_2$; in the case of condenser, the fixed plates of which are inclined at an angle such as will be described later, or in the case of parallel plates, this function is linear. The double condenser may obviously be given other forms or shapes than that shown, and especially those shown in the French patent and the French patent application referred to above. In the same way, the device for measuring the voltage $V_{AB}$, may take very varied forms and in particular those which will be described later. The sensitivity of the device increases in inverse proportion to the dielectric distance, on condition that the impedance of the capacities $$\frac{1}{\omega C}$$

is small with respect to the impedance of the voltmeter circuit. This will be easily effected, even for small values of C.

It will further be noted with reference to Fig. 1 that the member comprised jointly by the feeler T of the comparator and the moving vane P of the double variable condenser is pivotally mounted at 3 about a fixed axis. The fixed plates 1 and 2 of the variable capacity are so angularly disposed with respect to each other that the planes in which their active surfaces lie pass through the said pivotal axis 3. The vane P has dimensions closely approximating to those of the plates 1 and 2 and is carried by a lever-arm 5. The end 4 of this lever either directly carries a feeler T or alternatively it may be in contact with a feeler which is adapted to carry out the desired measurement.

In accordance with the invention, the dielectric distance between the plates is reduced to a minimum, account being taken of the potentials applied between the electrodes. This has the advantage of increasing the value of the capacities $C_1$ and $C_2$ and also of increasing the sensitivity of the device by increasing the variations of $C_1$ and $C_2$ for the same amount of displacement. This also enables the bulk of the apparatus to be very considerably reduced, owing to the fact that only one single set of fixed and moving plates need be employed.

It should be observed that if care is taken to construct and mount the two fixed electrodes in a symmetrical manner, transverse displacement (at right angles to the plane of the drawing) of the moving vane P, has no effect on the ratio of the capacities, so that the readings obtained from the device are not affected by parallax.

It will also be noted that the position of the feeler T, of the point of contact with the said feeler, and also the position of the moving vane P on the arm 5 relative to the pivot 3, enables a certain mechanical amplification to be obtained.

Finally, the elements of the double condensers constructed in this way have no friction and thus do not absorb any energy. The pressure of the measurement may thus be reduced to very low values, just sufficient to obtain a contact with the part to be measured; this increases the accuracy of measurement. It should also be noted that any bending of the lever-arms will always remain a constant factor because of the practically total absence of friction.

In the basic diagram of connections shown in Fig. 2, the fixed plates 1 and 2 of the double variable condenser are connected to the terminals of a coil 8, one extremity of which is connected to the plate of a detector-oscillator-amplifier tube 6. The centre point of the coil 8 is connected to the positive terminal of a source of direct-current potential (represented as a battery), the negative terminal of which is connected to the cathode of the tube 6 in accordance with the usual practice. The pivoted member 4, 5 carrying the moving vane P and the comparator feeler T, is coupled directly to the control grid of the tube 6 and a measuring instrument V is included in series in the grid cathode return of this said tube.

It will be seen that this arrangement is precisely the equivalent of that shown in Fig. 1, the functions of the detector and the amplifier in Fig. 1 being combined with the voltage generator G in the form of the single triode 6. The adoption of a basic arrangement of this type enables the instrument to be constructed in an extremely light and compact form.

Referring back once again to Fig. 1, it is possible to utilise as a generator of alternating current any device suitable for that purpose such as vibrators, discharge tubes, transistors, etc. which may have particular advantages in the case of portable equipments by reason of their small supply voltages. Known oscillator circuits may also be employed which produce a wave-form which may or may not be sinusoidal (for example, relaxation oscillators). Alternating current of the ordinary industrial frequencies may even quite simply be used.

The use of low frequencies does not present any drawback other than the fact that it necessitates the use of a detector-amplifier circuit having a very high impedance because of the high impedance of the capacity elements, which can only be reduced by increasing the capacity of the elements of the gauge, the resistance of the measuring instrument circuit being always high with respect to the capacitance.

In the same way, all the known types of detectors and amplification units, such as copper-oxide and selenium rectifiers, germanium diodes, etc. may be utilized and in certain cases the amplification unit may be dispensed with.

In a preferred form of embodiment diagrammatically shown in Fig. 3, a single triode tube 6 carries out at the same time the functions of an oscillator, a detector and an amplifier in the same way as the tube 6 of Fig. 2. In addition to making possible the construction of a very small apparatus, this arrangement enables the tube to be mounted in the immediate proximity of the feeler, which makes the apparatus at the same time convenient and economical.

In this arrangement, the anode 7 of the triode 6 is connected to an inductance 8, having a central tapping connected to a source of direct current or pulsatory potential. The extremities 9 and 10 are each connected through a blocking condenser 11 to the fixed electrodes 1 and 2 of the double variable condenser in accordance with the invention. The moving vane P of the double condenser which moves in correspondence with the feeler T through the lever-arm 4, is insulated from earth and is connected to the grid 12 of the triode 6; a resistance 13 is provided in the return circuit of the grid 12 to the cathode 14 through a galvanometer V. A variable condenser 15 enables the point of symmetry to be slightly displaced and serves the purpose of a micrometer adjustment of position whilst at the same time increasing the useful reading zone.

The circuit differs from a standard Hartley oscillator circuit by the addition of a supplementary capacity. The result of this is that the energy impressed on the grid should be represented by a vector which is the sum of two vectors in phase-opposition and which correspond to the two halves of the inductance 8.

When the fixed condenser plates 1, 2, and the inductance 8 are in perfect balance with respect to the moving plate P of the condenser, and thus for a mean position of the feeler T of the comparator, the potential applied to the grid 12 is zero and the tube 6 cannot oscillate. If the feeler T moves downwards, that is if the moving vane P approaches the fixed plate 1, the potential impressed on the grid 12 is phase-displaced by 180° and prevents all oscillation. If the feeler T moves upward (corresponding to a larger dimension), and if the moving vane P approaches the fixed plate 2, the tube 6 functions as an oscillator. This arrangement thus serves to discriminate in respect of the direction of the displacement of measurement and the displacements are in consequence only measured in one direction. It is clear that the connections to the terminals of the double variable condenser may be reversed so as to measure the displacements in one direction or in the other, as may be required. It is also to be noted that the zero point of the apparatus corresponds to the central position.

The polarisation of the grid of the tube 6 is very small or nil, and its only object is to limit the plate output within admissable values, when the oscillations are set up. This limitation may be effected with advantage by the use of a tube having a number of grids, or by means of a potential applied to a screen-grid to limit the plate current to a normal value.

Fig. 4 shows a form of embodiment of the comparator feeler and of the double variable condenser, which is particularly adapted for internal measurement. The same reference numerals have been applied to the same corresponding parts as in Fig. 1.

It will be noted that the pivotal member S is extended to form the fixed portion of the double feeler of this instrument and that the upper fixed plate 1 is fixed in its normal position by a pair of abutment members a and b against which it is normally urged by a spring d. This arrangement serves as a resilient buffer to permit measurement of parts of extra thickness, a capacitor being inserted between each fixed plate and the coil terminals to avoid short-circuits when the two plates come into contact.

A similar resilient mounting is shown for the fixed plate 2 of the double condenser unit illustrated in Fig. 3, the plate 2 being normally urged against its fixed position by means of a central compression spring 22.

For external measurements, the arrangement shown in Fig. 5 may be adopted, in which the feeler rod R is adapted to actuate the moving vane P through the medium of a cranked lever-arm 4.

Fig. 6 shows the variations of the grid potential A, of the plate current B and of the high-frequency potential C across the terminals of the inductance 8 of Fig. 3, as functions of the displacement of the feeler T of the comparator, starting from a point corresponding to the initiation of oscillations. These curves have particular reference to the operating circuit shown in Fig. 3.

It will be seen that the grid potential A begins by varying in accordance with a law supposed to be linear, having a fairly sharp slope (zone I) after which it curves sharply (zone II) so as to follow a variation which is approximately linear and with a less pronounced slope (zone III).

The plate current B, which is fairly high at the outset (and which is limited as indicated above by means of a suitable device), falls away fairly rapidly and in a practically linear manner in the zone I, bends sharply to the right in zone II and thereafter becomes almost constant in zone III. Finally, the high frequency potential across the terminals of the inductance 8 begins by rising sharply in an almost linear manner in the zone I, curves sharply in zone II and becomes almost constant in zone III.

The two curves A and B suggest a number of possibilities of utilisation of the arrangement so as to effect measurements or to actuate a control as a function of the displacement of the feeler T of the comparator:

(a) By a measurement of the grid potential A in the zone I. There is available here a high sensitivity, but this zone is only of small range and thereafter falls rapidy into a zone in which the variations of the potential are no longer proportional to the displacement (zone II). The range of the measurement in this case is a few microns.

(b) By measurement of the grid potential A, in the zone III. There is in this case available a proportional reading and a large range of measurement (several tenths of a millimeter). This is the preferred form of utilisation for measurement. The measuring instrument V may then be directly graduated in units of length.

(c) By the variation of the plate current B in the zone I. This is the preferred method of utilisation for the control of a machine as a function of the variation of a dimension. It will be seen that when the variation tends towards zero, there is a very rapid increase of plate current which can be used in the coil 16 of a relay 17 (see Fig. 3) in order to actuate a contact located in a utilisation circuit. The relay 17 may be provided with a compensating winding 18 which provides a magnetic field equal and opposite to that set up by the stable plate current obtained in the case of large displacements of the feeler. The compensating coil 18 may be connected with advantage to a tapping point on the source of direct current voltage, shown in Fig. 3 as a battery. The moving relay contact 19 is adapted to open or close the circuit of the control device CD (Fig. 3).

It will be noted that in the zone I, the plate current also varies in a linear manner as a function of the supply potential, and this may give rise to an error. In practice, for different values of the supply potential, one varies the slope of the straight-line portion which coincides with the plate current curve, but these straight lines cut the axis e at a fictitious point N which is fixed because the current is zero. The compensating winding, or a potentiometer device which annuls the current passing through the relay at a fixed point of the curve, give a real existence to the point N and, at this point, the errors due to the supply potential are eliminated. The zero point thus corresponds precisely to a given position of the feeler T and is independent of the supply voltage and of atmospheric temperature.

In the case of a measurement utilizing the grid potential A in the zone III as a measurement of the displacement of the feeler T, the grid potential has a slope which also depends on the direct current potential applied to the tube. Errors may also result, due to variations of this potential.

The supply potential may be stabilized by known means, or in the case in which accumulators are used, a rheostat is employed so as to fix the voltage at a definite value which will be checked by means of a voltmeter. Either one or the other of the two following methods may also be employed:

(1) The peaks of the alternating pulsating voltage applied to the plate in the zone III may be removed by means of a gas-filled tube 20 connected in parallel with the inductance 8, as shown in Fig. 7. This compensates for errors due to variations in plate voltage and in heating voltage.

(2) The tension read on the grid as a function of the potential measured and of the supply potential may be corrected. To do this, it will suffice to replace the supply resistance of the measuring instrument V by a device 21, Fig. 8, the resistance of which varies in dependence on the supply potential (a resistance having a high temperature coefficient), or to connect in parallel with the measuring instrument, a resistance having a negative temperature coefficient, these resistances being indirectly heated, for example by means of the heater supply current, as shown diagrammatically in Fig. 8.

If it were necessary to amplify the potential, the circuit arrangement of Fig. 3 could be used and completed by one or a number of amplifiers, the potential to be amplified being taken, depending on the case considered, from the inductance 8 at the point 9 or 10, or from the resistances 13 or 21 at the point D (see Figs. 3 and 8). These connections are shown in dotted lines at X, $X_1$, $X_2$ in Fig. 8, the amplifiers being diagrammatically represented at A and the utilisation device at UD. This circuit is completed by an earth connection from the cathode side of the measuring instrument to earth, as shown at E, also in dotted lines.

When the electrode of the double variable condenser which is mechanically connected directly to the feeler T cannot be insulated from earth, the circuit arrangement shown in Fig. 9 is utilized, in which the grid is supplied through two capacities C, C', connected to the extremities of an inductance coil 23, and which receives in consequence two potentials in phase-opposition, the anode being connected to one terminal of a coil 24 inductively coupled with coil 23 and having its other terminal connected to the positive terminal of the direct current source. As the earth return circuit is carried out through two further capacities $C_1$, $C_2$, constituted by the double variable condenser in accordance with the invention, there results a grid potential with respect to earth which is in phase, and enables oscillations to be initiated, or in phase-opposition, depending on the position of the feeler with respect to its mean position.

The triode tubes shown can clearly be replaced by transistors, or by electrode valves having several grids, or by any other equivalent device. In consequence, in the appended claims, the expression "electronic tube" is intended to designate any electronic device having an anode, a cathode, at least one grid, or other equivalent electrode elements, while the term "grid" designates the control electrode of such a device. The other grids or electrodes, if any, of the said device may be used to obtain additional control effects.

An alternative form of arrangement with a transistron is shown in Fig. 10. The portion A shows a transistron generator of known type. The portion B represents the unit in which mechanical displacements are converted into variations of electrical quantities, which is the main object of the present patent. A glow-discharge tube is used to stabilize the potential applied to the external fixed electrodes of the double measuring condenser. The portion C represents an arrangement for measuring the output potential employing a germanium diode which is also of known type.

What is claimed is:

1. A comparator constituted by a double condenser formed by two fixed external plates, the active surfaces of which lie in planes which meet in an axis, an intermediate plate movable around said axis, a source of alternating current potential connected to said etxernal plates, a device adapted to indicate variations in the said alternating current potential and connected between one of said external plates and the movable plate, and means to displace said movable plate as a function of the displacement of the feeler of said comparator, whereby a slight displacement of said feeler is transformed into a substantial and virtually linear variation of the potential applied to the said device, due to the fact that said movable plate is brought to a potential falling within the linear gradient of potential between said fixed external plates.

2. A comparator constituted by a double condenser formed by two fixed external plates, the active surfaces of which lie in planes which meet in an axis, and by an intermediate plate movable around said axis, means for displacing said movable plate as a function of the displacement of the feeler of said comparator, a coil, the terminals of which are respectively connected to said external plates, an electronic tube, the grid of which is connected to said movable plate and the anode of one of the terminals of said coil, a source of direct current potential, the negative terminal of which is connected to the cathode of said tube and the positive terminal to the centre point of said coil, and an electrical measuring instrument connected between said cathode and the said grid, whereby a slight displacement of said feeler is transformed into a substantial and virtually linear variation of the potential shown on said electrical measuring instrument, due to the fact that said movable plate is brought to a potential corresponding to the linear gradient of potential between the said external plates.

3. A comparator constituted by a double condenser formed by two external plates, the active surfaces of which lie in planes which meet in an axis, and by an intermediate plate, movable around said axis, means for displacing said movable plate as a function of the displacement of the feeler of said comparator, a coil, the terminals of which are respectively connected to said external plates, an electronic tube, the grid of which is connected to said movable plate and the anode to one of the terminals of said coil, a source of direct current potential, the negative terminal of which is connected to the cathode of said tube, a relay connected between the positive terminal of said source and the centre point of said coil, and a resistance connected between said cathode and said grid, whereby a slight displacement of the feeler of said comparator is transformed into a substantial variation of the output passing through said relay.

4. A comparator constituted by a double condenser formed by two fixed external plates, the active surfaces of which lie in planes which meet in an axis, and by an intermediate plate movable around said axis, means for displacing said movable plate as a function of the displacement of the feeler of said comparator, a coil, the terminals of which are respectively connected to said external plates, an electronic tube, the grid of which is connected to said movable plate and the anode to one of the terminals of said coil, a source of direct current potential, the negative terminal of which is connected to the cathode of said tube, a relay connected between the positive terminal of said source and the centre point of said coil, and an electrical measuring instrument connected between said cathode and said grid, whereby a slight displacement of the feeler of said comparator is transformed both into a substantial and virtually linear variation of the potential shown on said measuring instrument, and a substantial variation of the output passing through said relay.

5. A comparator according to claim 3, further comprising a trimmer condenser connected between said movable plate and one of said external plates to permit of easy adjustment of the zero setting point.

6. A comparator according to claim 3, in which the said relay comprises a compensation coil energized from said direct current source.

7. A comparator according to claim 2, further comprising a glow-discharge tube, the terminals of which are respectively connected to said external plates.

8. A comparator according to claim 2, further comprising a resistance varying as a function of temperature and connected in the circuit of said electrical measuring instrument, and arranged in such manner that its indications are independent of variations in the supply potential.

9. A comparator constituted by a double capacity formed by two fixed external plates, the active surfaces of which lie in planes which meet in an axis, an intermediate plate movable around said axis, means for displacing said movable plate as a function of the displacement of the feeler of said comparator, a coil, the terminals of which are respectively connected to said external plates, an electronic tube, the grid of which is connected to the terminals of said coil through two capacitors, and the anode of which is connected to the first terminal of a second coil inductively coupled to said first coil, the second terminal of said second coil being connected to the positive terminal of a source of direct current potential, the negative terminal of which is connected to the cathode of said electronic tube, and an electrical measuring instrument connected between said cathode and said grid, the central movable plate of said double condenser being connected to said cathode whereby the said movable plate may be grounded.

10. A comparator according to claim 3, in which resilient means are provided to urge constantly one of said external plates towards said movable plate, abutment means being provided to limit said displacements, whereby said movable plate is enabled to force back the said external plate and thus to permit measurements of elements having extra thicknesses, and further comprising two capacitors each interposed between one of said external plates and the terminals of said coil, whereby short-circuits are avoided when the said movable plate comes in contact with said resiliently urged external plate.

11. A comparator constituted by a double condenser formed by two fixed external plates, the active surfaces of which lie in planes which meet in an axis, and by an intermediate plate movable around said axis, means for displacing said movable plate as a function of the displacements of the feeler of said comparator, a coil, the terminals of which are respectively connected to said external plates, an electronic tube, the grid of which is connected to said movable plate, and the anode to one of the terminals of said coil, a source of direct current potential, the negative terminal of which is connected to the cathode of said tube and the positive terminal of which is connected to the mid point of said coil, a resistance connected between the cathode and the grid of said tube, and means adapted to carry out a control operation as a function of the alternating current characteristics of the circuit of said comparator, which characteristics vary in accordance with the displacement of the feeler of said comparator, said means being connected to a point of said circuit through a capacitor.

References Cited in the file of this patent
UNITED STATES PATENTS

| | | |
|---|---|---|
| 2,143,658 | Morris et al. | Jan. 10, 1939 |
| 2,371,040 | Fisher et al. | Mar. 6, 1945 |
| 2,387,496 | Cornelius | Oct. 23, 1945 |
| 2,510,822 | Jacot et al. | June 6, 1950 |